United States Patent
Kawanabe et al.

(10) Patent No.: US 9,924,113 B2
(45) Date of Patent: Mar. 20, 2018

(54) RADIATION IMAGING APPARATUS AND RADIATION IMAGING SYSTEM

(71) Applicant: CANON KABUSHIKI KAISHA, Tokyo (JP)

(72) Inventors: Jun Kawanabe, Kumagaya (JP); Minoru Watanabe, Honjo (JP); Keigo Yokoyama, Honjo (JP); Masato Ofuji, Takasaki (JP); Kentaro Fujiyoshi, Tokyo (JP); Hiroshi Wayama, Honjo (JP); Kazuya Furumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 14/960,567

(22) Filed: Dec. 7, 2015

(65) Prior Publication Data
US 2016/0161617 A1    Jun. 9, 2016

(30) Foreign Application Priority Data
Dec. 9, 2014   (JP) ................................. 2014-249429

(51) Int. Cl.
H04N 5/32   (2006.01)

(52) U.S. Cl.
CPC .................................... H04N 5/32 (2013.01)

(58) Field of Classification Search
CPC ....................................................... H04N 5/32
See application file for complete search history.

(56) References Cited

U.S. PATENT DOCUMENTS

| | | | |
|---|---|---|---|
| 6,690,493 B1* | 2/2004 | Kobayashi | H04N 5/3454 348/307 |
| 2012/0318959 A1* | 12/2012 | Yamaguchi | H01L 27/14632 250/208.1 |
| 2013/0170620 A1* | 7/2013 | Tredwell | G01T 1/2018 378/91 |
| 2015/0116531 A1* | 4/2015 | Sato | H04N 19/172 348/222.1 |

FOREIGN PATENT DOCUMENTS

JP         2012-15913 A     1/2012

* cited by examiner

Primary Examiner — Mark R Gaworecki
(74) Attorney, Agent, or Firm — Canon U.S.A., Inc. IP Division

(57) ABSTRACT

An apparatus includes a plurality of imaging pixels configured to acquire a radiation image, a plurality of detection pixels each including a detection conversion element and a detection switch element, a drive unit configured to drive the detection switch element of each of the plurality of detection pixels, a plurality of detection regions in each of which the plurality of detection pixels are arranged, a control unit configured to control the drive unit to drive the plurality of detection pixels arranged in each of the plurality of detection regions at respective different timing, and an acquisition unit configured to acquire an amount of incidence of radiation rays on each of the plurality of detection regions based on a value obtained by summing or averaging signals read out from the plurality of detection pixels.

16 Claims, 13 Drawing Sheets

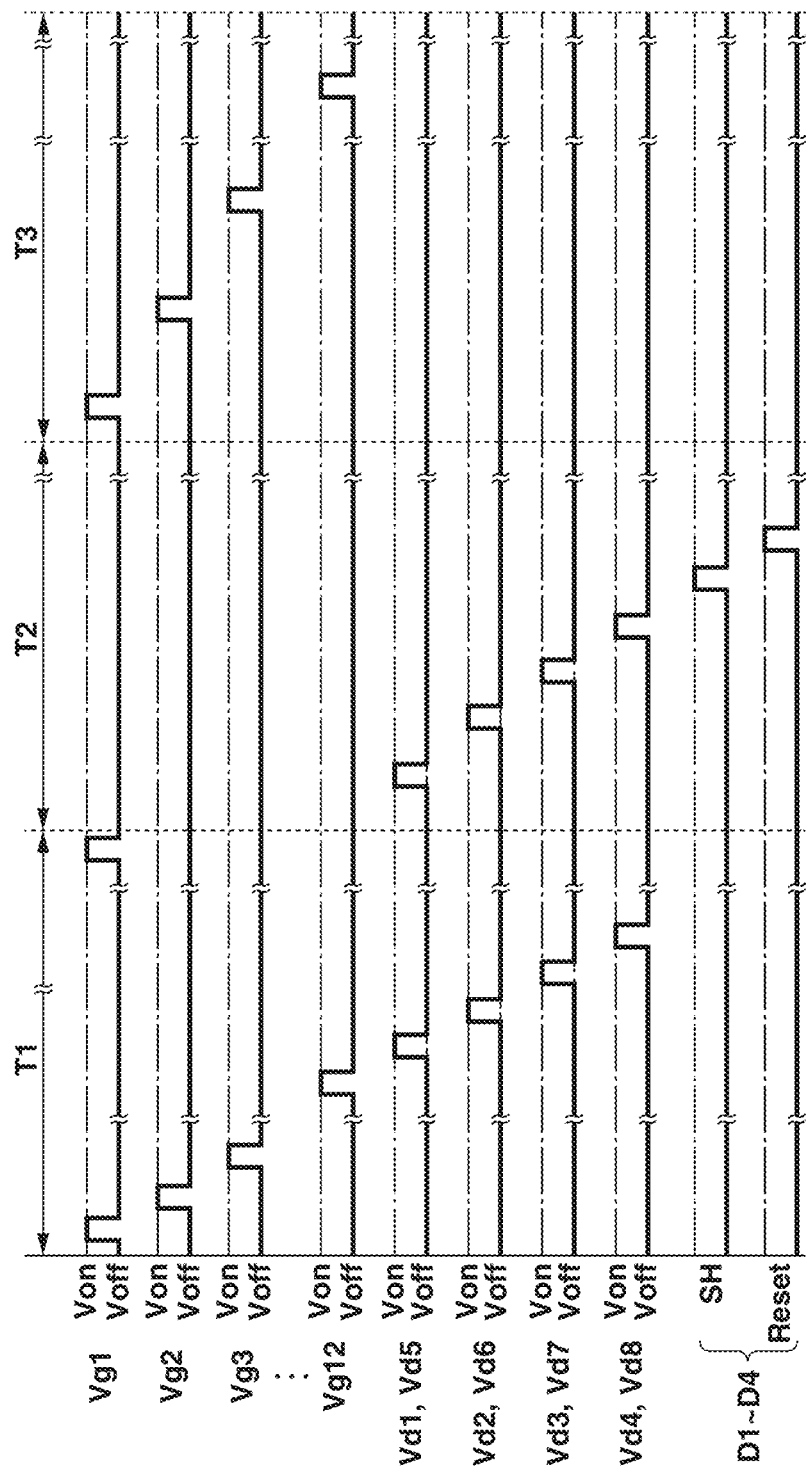

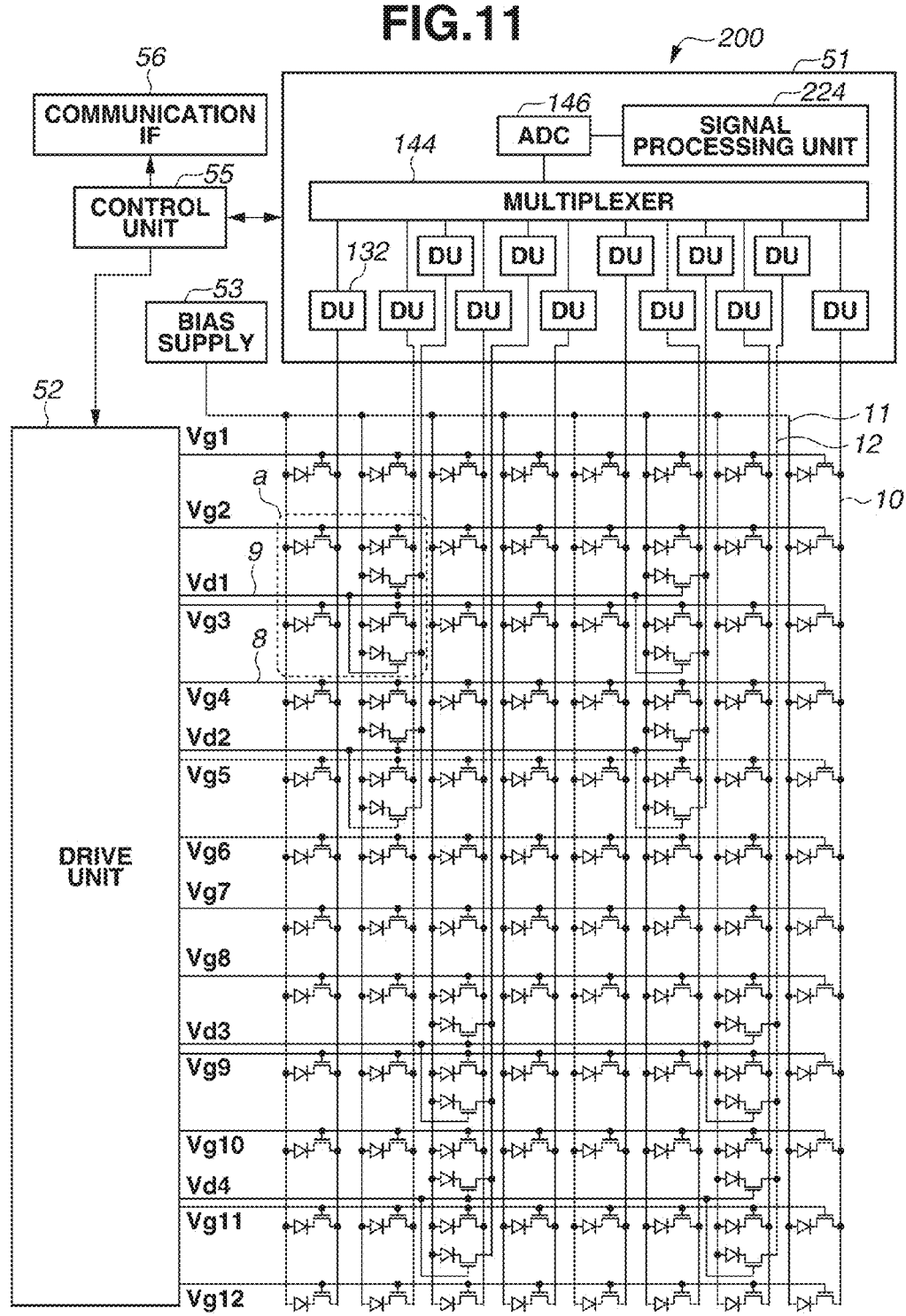

RADIATION IMAGING APPARATUS AND RADIATION IMAGING SYSTEM

BACKGROUND OF THE INVENTION

Field of the Invention

Aspects of the present invention generally relate to a radiation imaging apparatus and a radiation imaging system.

Description of the Related Art

As radiation imaging apparatuses for use in medical diagnostic imaging or nondestructive testing using radiation rays, such as X-rays, there has been put to practical use a radiation imaging apparatus including a matrix substrate having an array of pixels each composed of a combination of a switch, such as a thin-film transistor (TFT), and a conversion element, such as a photoelectric conversion element.

In recent years, radiation imaging apparatuses having multiple functions have been considered. These functions include a built-in function of monitoring irradiation with radiation rays. This function enables, for example, detection of timing at which irradiation with radiation rays from a radiation source has been started, detection of timing at which irradiation with radiation rays is to be stopped, and detection of the dosage or cumulative dosage of radiation rays.

Japanese Patent Application Laid-Open No. 2012-15913 discusses a radiation imaging apparatus in which imaging pixels, which are used to acquire a radiation image, and detection pixels, which are used to detect radiation rays, are arrayed in a matrix shape. The radiation imaging apparatus has also a configuration to read out a signal for detecting radiation rays via a switch connected to each detection pixel. Furthermore, the radiation imaging apparatus discussed in Japanese Patent Application Laid-Open No. 2012-15913 has a configuration in which a plurality of detection pixels is arranged in a particular region in a concentrated manner and a configuration in which switch elements connected to a plurality of detection pixels are concurrently made conductive to read out signals.

However, in the radiation imaging apparatus discussed in Japanese Patent Application Laid-Open No. 2012-15913, at the time of switching of the conductive state, along with a change in voltage of a control line connected to a switch element, a parasitic element (parasitic capacity) occurring between the control line and a signal line may cause a variation in potential of the signal line.

In particular, in a case where signals are concurrently read out from a plurality of detection pixels arranged in a particular region, the influence of a variation in potential of the signal line may become remarkable. Therefore, the accuracy of detection of irradiation with radiation rays may be inadequate.

SUMMARY OF THE INVENTION

According to an aspect of the present invention, an apparatus includes a plurality of imaging pixels configured to acquire a radiation image, a plurality of detection pixels each including a detection conversion element, which detects an incident radiation ray, and a detection switch element, which is connected to the detection conversion element, a drive unit configured to drive the detection switch element of each of the plurality of detection pixels, a plurality of detection regions in each of which the plurality of detection pixels are arranged, a control unit configured to control the drive unit to drive the plurality of detection pixels arranged in each of the plurality of detection regions at respective different timing, and an acquisition unit configured to acquire an amount of incidence of radiation rays on each of the plurality of detection regions based on a value obtained by summing or averaging signals read out from the plurality of detection pixels.

Further features of the present invention will become apparent from the following description of exemplary embodiments with reference to the attached drawings.

BRIEF DESCRIPTION OF THE DRAWINGS

FIG. 5 illustrates an operation of the radiation imaging apparatus according to the first exemplary embodiment.

FIG. 11 illustrates a configuration of a radiation imaging apparatus according to a fifth exemplary embodiment.

DESCRIPTION OF THE EMBODIMENTS

Various exemplary embodiments, features, and aspects of the invention will be described in detail below with reference to the drawings. In each exemplary embodiment, the term "radiation ray" includes alpha ($\alpha$) ray, beta ($\beta$) ray, and gamma ($\gamma$) ray, which are beams produced by particles (including photons) emitted by radioactive decay, and beams having energy almost equal to or higher than the first-mentioned beams, such as X-ray, particle ray, and cosmic ray.

Figure 1:
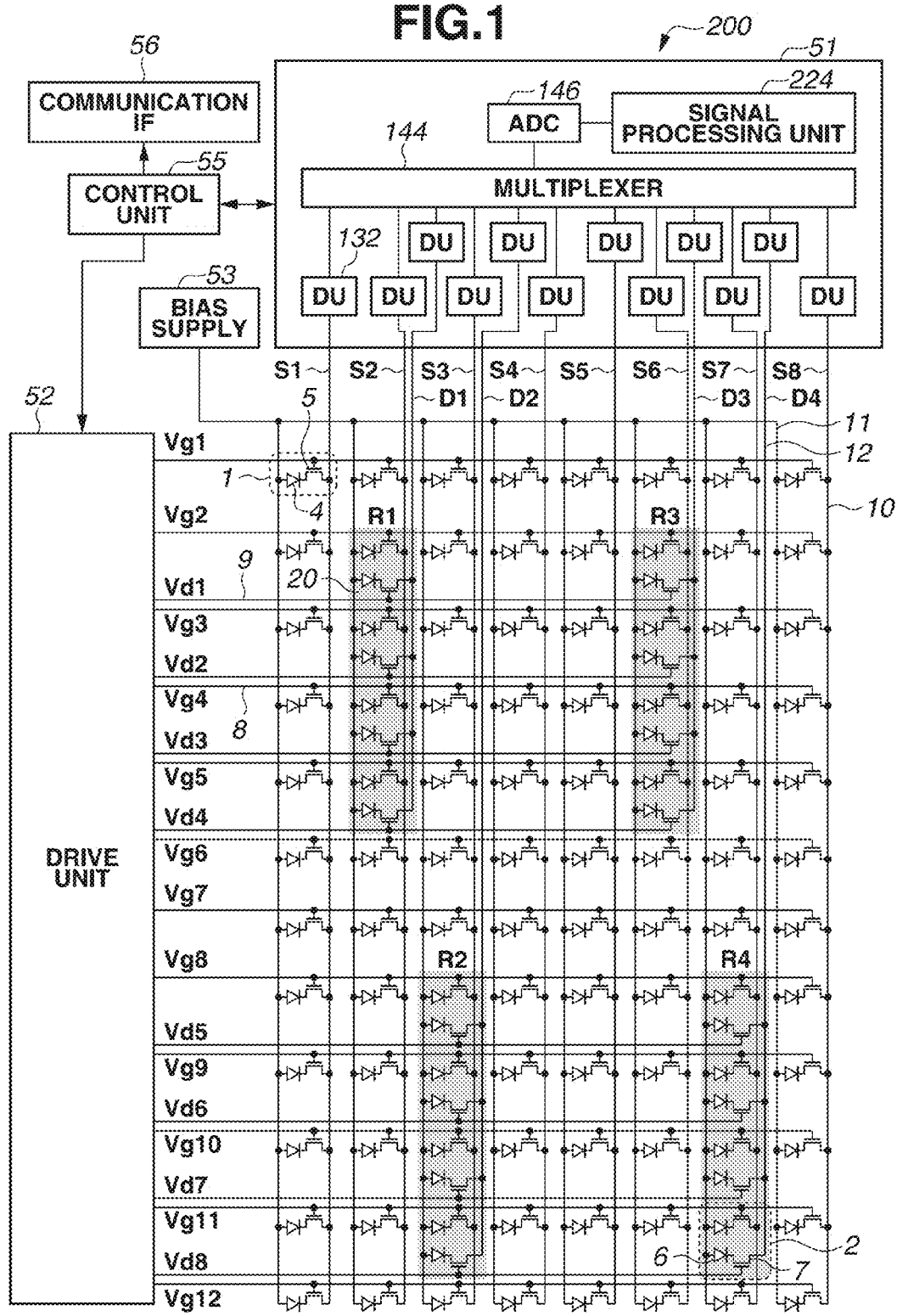
FIG. 1 illustrates a configuration of a radiation imaging apparatus according to a first exemplary embodiment.

A first exemplary embodiment is described with reference to FIG. 1. FIG. 1 illustrates a configuration of a radiation imaging apparatus according to the first exemplary embodiment. In the present exemplary embodiment, while, in FIG. 1, an example is illustrated in which 12 rows by 8 columns of pixels are arranged, 1000×1000 pixels may be arranged or 5000×5000 pixels may be arranged.

A radiation imaging apparatus 200 illustrated in FIG. 1 includes a plurality of imaging pixels 1, which is used to acquire a radiation image, and a plurality of detection pixels 2, each of which includes a detection conversion element 6, which detects an incident radiation ray, and a switch element 7, which is connected to the detection conversion element 6.

The radiation imaging apparatus 200 further includes a plurality of detection regions 20, each of which includes the plurality of detection pixels 2. Furthermore, the radiation imaging apparatus 200 includes at least detection signal lines 12, a readout unit 51, a drive unit 52, and a control unit 55.

In the following description, with regard to a plurality of imaging pixels 1 and a plurality of detection pixels 2, the direction of an array of pixels juxtaposed in a direction in which each signal line 10 extends is referred to as a column direction, and the direction of an array of pixels juxtaposed in a direction perpendicular to the column direction is referred to as a row direction.

The imaging pixel 1, which is used to acquire a radiation image, includes an imaging conversion element 4 and a first switch element 5. The detection pixel 2, which has the function to detect an incident radiation ray, includes an imaging conversion element 4, a first switch element 5, a detection conversion element 6, and a second switch element 7. Therefore, in the present exemplary embodiment, the detection pixel 2 has both the function to detect an incident radiation ray and the function to acquire a radiation image. While an example in which the detection pixel 2 includes the imaging conversion element 4, the first switch element 5, the detection conversion element 6, and the second switch element 7 is described, this example is not limiting. For example, the detection pixel 2 may include only the detection conversion element 6 and the second switch element 7. In the case of such an example, the details of which are described below in a third exemplary embodiment, the detection conversion element 6 of the detection pixel 2 may be arranged in a size almost equal to that of the imaging conversion element 4 of the imaging pixel 1.

Furthermore, an imaging switch element in the present invention corresponds to the first switch element 5 according to the present exemplary embodiment. Moreover, a detection switch element in the present invention corresponds to the second switch element 7 according to the present exemplary embodiment.

Each of the imaging conversion element 4 and the detection conversion element 6 includes a scintillator (not illustrated) which converts a radiation ray into light and a photoelectric conversion element which converts light into an electrical signal. The scintillator can be, for example, formed in such a sheet-like shape as to cover an imaging region and can be shared by a plurality of imaging pixels 1 and a plurality of detection pixels 2. Alternatively, each of the imaging conversion element 4 and the detection conversion element 6 can be composed of a conversion element which directly converts a radiation ray into an electrical signal.

Each of the first switch element 5 and the second switch element 7 can include, for example, a thin-film transistor (TFT) in which an active region is composed of a semiconductor, such as amorphous silicon or polycrystal silicon.

The imaging conversion element 4 is connected to the readout unit 51 via the first switch element 5 and the signal line 10 (one of signal lines S1 to S8). The detection conversion element 6 is connected to the readout unit 51 via the second switch element 7 and the detection signal line 12 (one of detection signal lines D1 to D4). The detection signal line 12 is connected in common to at least two switch elements 7 of the plurality of detection pixels 2.

All of the pixels are connected to a common bias line 11, via which a predetermined bias voltage is applied from a bias supply 53 to each pixel. Each of first switch elements 5 arranged on predetermined rows is connected to a first control line 8 (one of control lines Vg1 to Vg12). Each second switch element 7 is connected to a second control line 9 (one of control lines Vd1 to Vd8).

Furthermore, in FIG. 1, there are illustrated four detection regions 20 (R1 to R4 in FIG. 1) used to detect a radiation ray. In each detection region 20, a plurality of detection pixels 2 are arranged. Furthermore, a plurality of detection pixels 2 arranged in the detection region R1 is connected to a common detection signal line 12 (D1 in FIG. 1). A plurality of detection pixels 2 arranged in each of the detection regions R2 to R4 is also similarly connected to a common detection signal line 12 (D2, D3, or D4 in FIG. 1). While, in FIG. 1, there are illustrated four detection regions 20 arranged in a 2×2 matrix form, this is not limiting. For example, 25 detection regions 20 arranged in a 5×5 matrix form can be arranged, or 100 detection regions 20 arranged in a 10×10 matrix form can be arranged. The detection regions 20 can be arranged to be equally dispersed on the substrate, or can be arranged to be concentrated on a particular range. Furthermore, in the present exemplary embodiment, a plurality of detection pixels 2 is arranged in each detection region 20. In this case, it is desirable that the detection pixels 2 be arranged at least in a regular way, such as in row direction, in column direction, or in diagonal direction, within each detection region 20.

The regular arrangement includes not only a case where the detection pixels 2 are arranged in a continuous manner but also a case where the imaging pixel 1 and the detection pixel 2 are arranged at predetermined intervals within each detection region 20.

The arrangement of the imaging pixels 1 and the detection pixels 2 is just an example, and is not limiting.

The drive unit 52 drives the plurality of imaging pixels 1 via the first control lines 8. The drive unit 52 further drives the plurality of detection pixels 2 via the second control lines 9. The drive unit 51 is electrically connected to the first control lines 8 and the second control lines 9. The second control lines 9 are individually connected to the respective detection pixels 2 within each detection region 20.

The readout unit 51 can include a plurality of detection units 132, a multiplexer 144, and an analog-digital converter (ADC) 146. The plurality of signal lines 10 and the plurality of detection signal lines 12 are respectively connected to the corresponding detection unit 132 among the plurality of detection units 132 included in the readout unit 51. Here, one signal line 10 or detection signal line 12 is associated with one detection unit 132. In other words, in the present exemplary embodiment, the readout unit 51 reads out electrical signals output from the imaging pixel 1 and the detection pixel 2 via the respective different signal lines. Each detection unit 132 includes, for example, a differential amplifier and a sample-and-hold circuit. The multiplexer 144 selects the plurality of detection units 132 in a predetermined order, and supplies a signal output from the selected detection unit 132 to the ADC 146. The ADC 146 converts the supplied signal into a digital signal and outputs the digital signal. The digital signal output from the ADC 146 is supplied to a signal processing unit 224 and is then processed by the signal processing unit 224.

The signal processing unit 224 outputs information indicating the irradiation with radiation rays to the radiation imaging apparatus 200 based on the output of the ADC 146. More specifically, the signal processing unit 224, for example, detects the irradiation with radiation rays to the radiation imaging apparatus 200 and calculates the dosage and/or cumulative dosage of radiation rays. In other words, in the present exemplary embodiment, the readout unit 51 can obtain the amount of incidence of radiation rays for each of a plurality of detection regions based on signals read out from the detection pixels 2 driven by the drive unit 52. The readout unit 51 calculates (obtains) the amount of incidence of radiation rays on each of the plurality of detection regions 20 based on a value obtained by summing or averaging values corresponding to signals acquired from a plurality of detection pixels arranged in each detection region 20. The summing or averaging processing is performed by the signal processing unit 224 processing a digital signal acquired from the ADC 146. Furthermore, this summing or averaging processing is not limiting. For example, the amount of incidence of radiation rays can also be calculated (obtained) by the detection unit 132 supplying to the ADC 146 a signal obtained by summing or averaging analog signals acquired from a plurality of detection pixels 2 input to the differential amplifier. While, in FIG. 1, the signal processing unit 224 is included in the readout unit 51, this is not limiting. For example, the signal processing unit 224 may be included in the control unit 55, or may be included in neither the readout unit 51 nor the control unit 55.

An acquisition unit in the present invention corresponds to the signal processing unit 224 in the present exemplary embodiment.

The control unit 55 controls the drive unit 52 and the readout unit 51. The control unit 55, for example, controls the start and end of an exposure (the accumulation of electric charge corresponding to radiation rays with which the imaging pixel 1 is irradiated) based on information output from the signal processing unit 224. In other words, the control unit 55 can measure the amount of incidence of radiation rays based on the amount of radiation rays detected by the detection conversion element 6.

Figure 2:
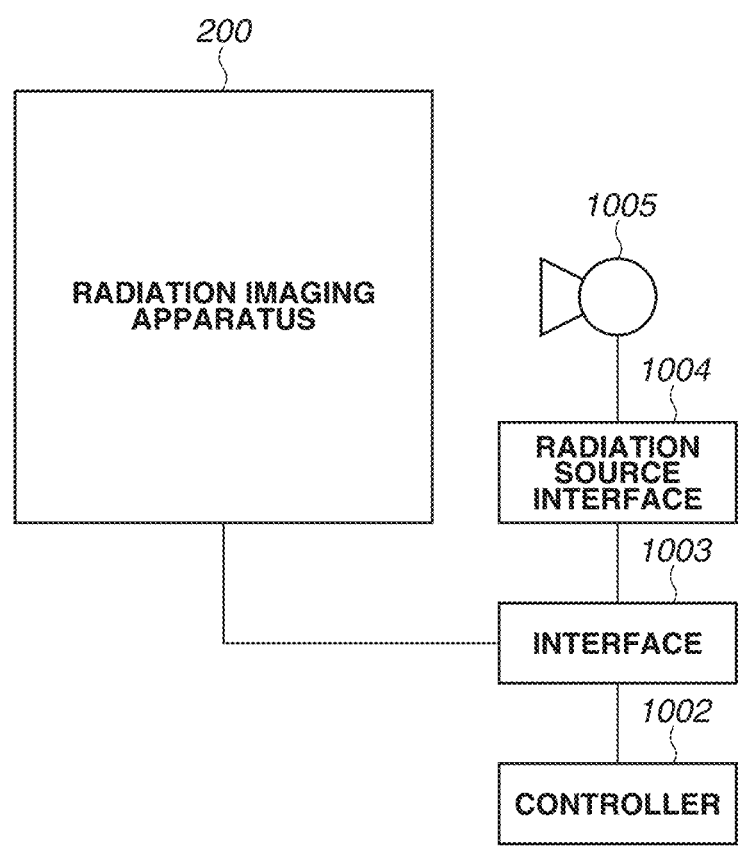
FIG. 2 illustrates a configuration example of a radiation imaging system including the radiation imaging apparatus.

FIG. 2 illustrates an example configuration of a radiation imaging system including the radiation imaging apparatus 200. The radiation imaging system includes, in addition to the radiation imaging apparatus 200, a controller 1002, an interface 1003, a radiation source interface 1004, and a radiation source 1005.

The controller 1002 allows inputting of a dose A, an irradiation time B (millisecond (ms)), a tube current C (milli-ampere (mA)), a tube voltage D (kilovolt (kV)), and a detection region, which is a region in which to monitor radiation rays. When an exposure switch (not illustrated) attached to the radiation source 1005 is operated, radiation rays are radiated from the radiation source 1005. For example, when the integrated value of signals read out from the detection pixels 2 arranged in the detection region 20 has reached a dose A', the control unit 55 of the radiation imaging apparatus 200 transmits an exposure stop signal to the radiation source interface 1004 via the interface 1003. In response to the exposure stop signal, the radiation source interface 1004 stops the radiation source 1005 from radiating radiation rays. Here, the dose A' can be determined by the control unit 55 based on the dose A, a radiation-ray irradiation intensity, a communication delay between each unit, and a processing delay. In a case where the irradiation time for radiation rays has reached the irradiation time B, the radiation source 1005 stops radiation of radiation rays regardless of the presence or absence of the exposure stop signal.

Figure 3A:
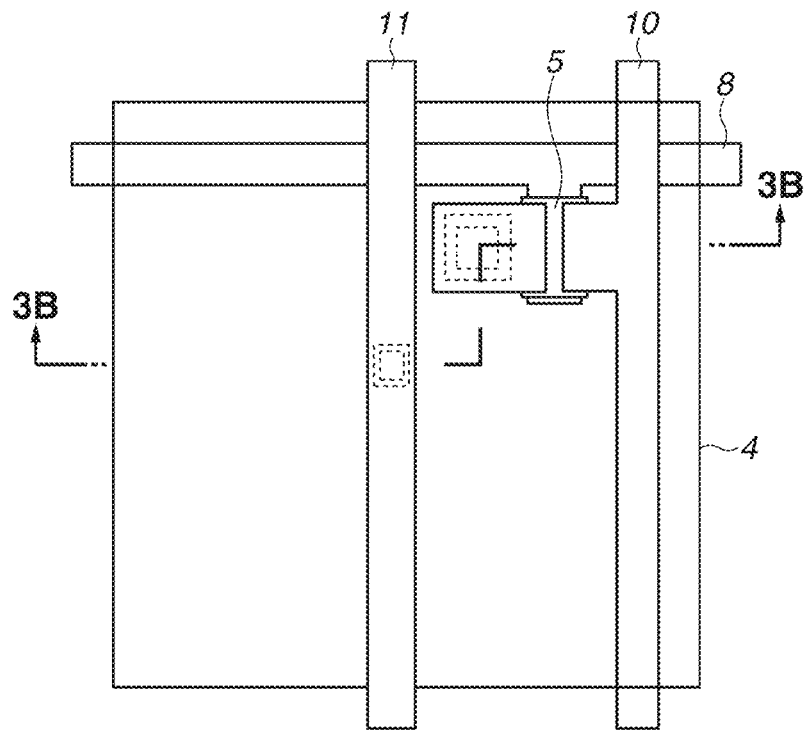
FIGS. 3A and 3B illustrate an imaging pixel in the radiation imaging apparatus according to the first exemplary embodiment.
Figure 3B:
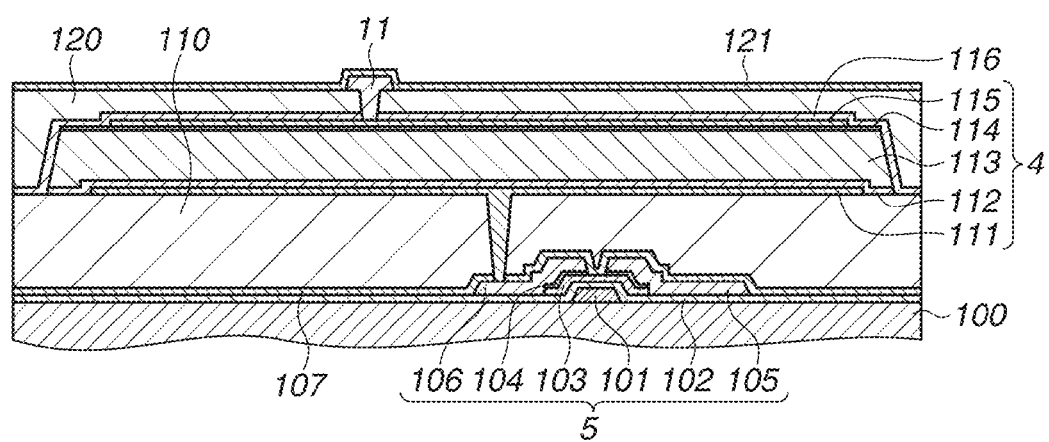

Next, a configuration of the imaging pixel 1 is described with reference to FIGS. 3A and 3B. FIG. 3A is a plan view of the imaging pixel 1, and FIG. 3B is a sectional view of the imaging pixel 1 taken along line 3B-3B.

The imaging pixel 1 in the present exemplary embodiment includes an imaging conversion element 4 and a first switch element 5, which outputs an electrical signal corresponding to electric charge accumulated in the imaging conversion element 4. The first switch element 5 is laid on an insulating substrate 100, such as a glass substrate. The imaging conversion element 4 is laid on the first switch element 5 across a first interlayer insulating layer 110. The insulating substrate 100, the first switch element 5, the first interlayer insulating layer 110, and the imaging conversion element 4 are arranged in layers. The first switch element 5 includes, on the substrate 100 in order from the side closest to the substrate 100, a control electrode 101, a first insulating layer 102, a first semiconductor layer 103, a first impurity semiconductor layer 104, a first main electrode 105, and a second main electrode 106. Partial regions of the first impurity semiconductor layer 104 are respectively in contact with the first main electrode 105 and the second main electrode 106, and a region between regions of the first semiconductor layer 103 that are in contact with the partial regions of the first impurity semiconductor layer 104 serves as a channel region of the first switch element 5. The control electrode 101 is electrically connected to the control line 8, the first main electrode 105 is electrically connected to the signal line 10, and the second main electrode 106 is electrically connected to an individual electrode 111 of the imaging conversion element 4. Furthermore, in the present exemplary embodiment, the first main electrode 105, the second main electrode 106, and the signal line 10 are integrally formed with the same electrically-conductive layer, and the first main electrode 105 serves as a part of the signal line 10. A second insulating layer 107 and the first interlayer insulating layer 110 are laid, in order from the side of the signal line 10, on the first main electrode 105, the second main electrode 106, and the signal line 10. While, in the present exemplary embodiment, the first switch element 5 is an inversely-staggered switch element using a semiconductor layer and an impurity semiconductor layer the chief material of which is amorphous silicon, this is not limiting. For example, the first switch element 5 may be a staggered switch element the chief material of which is polycrystalline silicon, or may be an organic TFT switch element or an oxide TFT switch element. The first interlayer insulating layer 110 is arranged between the substrate 100 and a plurality of individual electrodes 111 in such a way as to cover the first switch element 5, and has a contact hole. The individual electrode 111 of the imaging conversion element 4 and the second main electrode 106 are electrically connected to each other at the contact hole provided in the first interlayer insulating layer 110. The imaging conversion element 4 includes, on the first interlayer insulating layer 110 in order from the side of the first interlayer insulating layer 110, the individual electrode 111, a second impurity semiconductor layer 112, a second semiconductor layer 113, a third impurity semiconductor layer 114, and a common electrode 115. A third insulating layer 116 is laid on the common electrode 115 of the imaging conversion element 4. Furthermore, the bias line 11, which is laid on a second interlayer insulating layer 120, is electrically connected to the common electrode 115 of the imaging conversion element 4. Moreover, a fourth insulating layer 121 serving as a protective film is laid on the bias line 11.

Figure 4A:
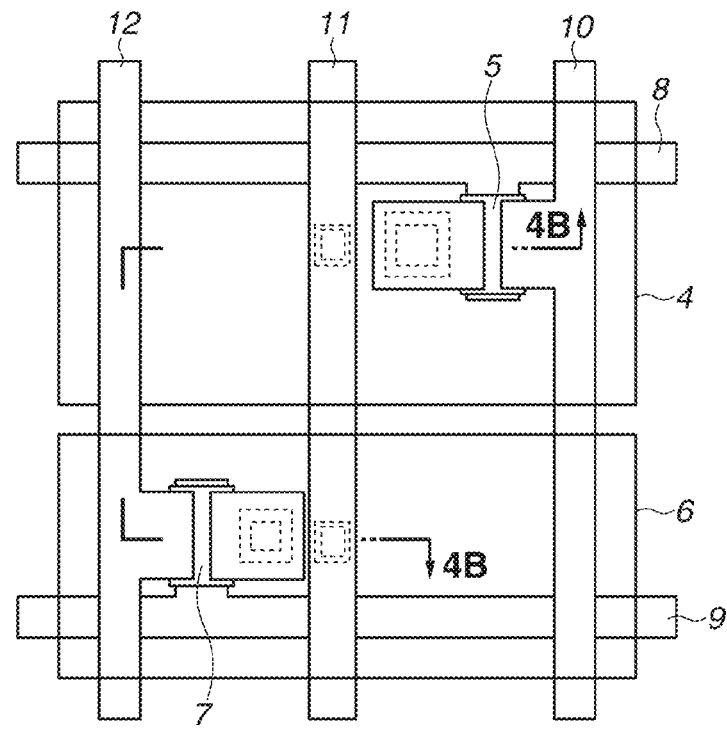
FIGS. 4A and 4B illustrate a detection pixel in the radiation imaging apparatus according to the first exemplary embodiment.
Figure 4B:
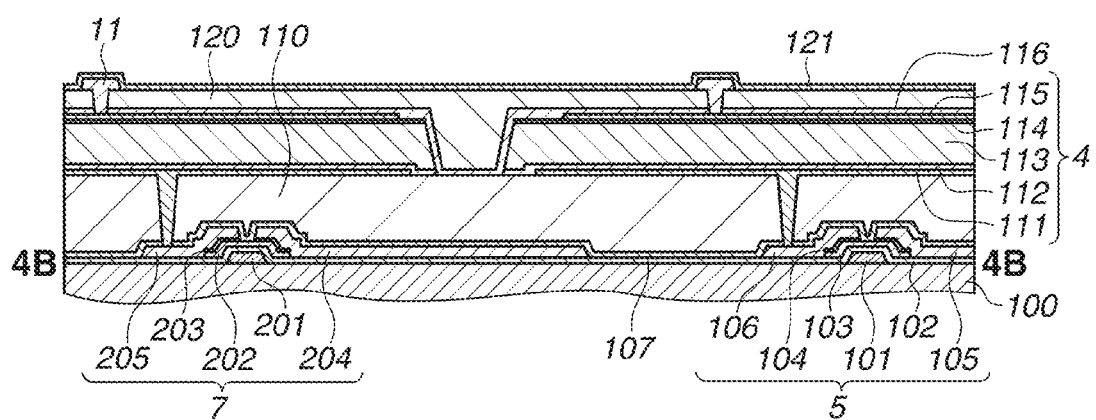

Next, a configuration of the detection pixel 2 is described with reference to FIGS. 4A and 4B. FIG. 4A is a plan view of the detection pixel 2, and FIG. 4B is a sectional view of the detection pixel 2 taken along line 4B-4B.

The detection pixel 2 in the present exemplary embodiment includes the imaging conversion element 4, the first switch element 5, the detection conversion element 6, and the second switch element 7. The detection conversion element 6 is laid, as a layer, on the first interlayer insulating layer 110 in the same structure as that of the imaging conversion element 4 of the imaging pixel 1. The bias line 11, which is laid on the second interlayer insulating layer 120, is electrically connected to the common electrode 115 for the imaging conversion element 4 and the detection conversion element 6. The individual electrode 111 for the detection conversion element 6 is connected to the detection signal line 12 via a contact hole provided in the first interlayer insulating layer 110. Furthermore, the second insulating layer 107 and the first interlayer insulating layer 110 are laid, in order from the side of the detection signal line 12, on the detection signal line 12.

Furthermore, since the aperture area of the imaging conversion element 4 of the detection pixel 2 is small as compared with that of the imaging pixel 1 in the present exemplary embodiment, the amount of signal from the detection pixel 2 may decrease. The influence of this decrease can be reduced by adjusting the gain of the detection unit 132 or by correcting a captured image. The correction of a captured image can be implemented by performing, for example, processing for executing interpolation using values of imaging pixels 1 surrounding a detection pixel 2. Moreover, while, in the present exemplary embodiment, each of the imaging conversion element 4 and the detection conversion element 6 is a p-i-n (PIN) type sensor, this is not limiting. For example, a metal-insulator-semiconductor (MIS) type or TFT type sensor may be used instead.

Next, an operation of the radiation imaging apparatus 200 according to the present exemplary embodiment is described with reference to the timing chart of FIG. 5. In the following description, suppose that voltages to be applied to the first control lines 8 used to drive the respective imaging pixels 1 are signals Vg1 to Vgm ("m" corresponding to "12" in FIG. 1), and suppose that voltages to be applied to the second control lines 9 used to drive the respective detection pixels 2 are signals Vd1 to Vd8. The first switch element 5 and the second switch element 7 each become conductive when a signal supplied to the gate thereof is at high level and become nonconductive when a signal supplied to the gate thereof is at low level. Combinations of the signal level and the conductive state can also be determined based on combinations of the circuit configuration and the conduction type of a switch element. Furthermore, operations of the readout unit 51 and the drive unit 52 illustrated in FIG. 5 are performed based on the control of the control unit 55 as mentioned in the foregoing. In the timing chart of FIG. 5, the high level is represented by "Von", and the low level is represented by "Voff". Furthermore, "on voltage" in the present invention corresponds to "Von" in the present exemplary embodiment. Moreover, "off voltage" in the present invention corresponds to "Voff" in the present exemplary embodiment.

First, the operation in a period T1 illustrated in FIG. 5 is described. The period T1 is a time period for which to wait for the start of irradiation with radiation rays. In the present exemplary embodiment, a time period from when the radiation imaging apparatus 200 is powered on to become ready to capture a radiation image to when the exposure switch of the radiation source 1005 is operated and the irradiation with radiation rays is detected corresponds to the period T1. In the period T1, Von voltages are sequentially applied to the first switch element 5 and the second switch element 7, and the individual electrodes 111 for the imaging conversion element 4 and the detection conversion element 6 are reset to the potentials of the signal line 10 and the detection signal line 12. Furthermore, the Von voltage may be constantly applied to the second switch element 7. This prevents electric charge generated by dark current from being accumulated at the imaging conversion element 4 of the imaging pixel 1 over a long time. The length of the period T1 is, for example, a few seconds to a few minutes although differing greatly according to imaging methods and conditions.

Next, the operation in a period T2 illustrated in FIG. 5 is described. The period T2 is a time period in which irradiation with radiation rays is being performed. For example, the period T2 is a time period from when the start of irradiation with radiation rays is detected to when the amount of exposure with radiation rays reaches an optimum dose. The period T2 can also be said to be a time period in which to monitor the amount of irradiation with radiation rays. In the period T2, the Von voltage is intermittently applied to the signals Vd1 to Vd8, the second switch element 7 of the detection pixel 2 is intermittently made conductive, and signals from the detection pixel 2 are read out. Since the Voff voltage is constantly applied to the signals Vg1 to Vgm, the first switch element 5 is made nonconductive. Here, when the Von voltage or the Voff voltage is applied to the second switch element 7, the potential of the detection signal line 12 may be varied via the parasitic capacity between the second control line 9 and the detection signal line 12. For example, electric charge is instantaneously injected from the second control line 9 to the detection signal line 12 via the parasitic capacity due to the application of the Von voltage or the Voff voltage, so that the potential of the detection signal line 12 is varied. In the present exemplary embodiment, with respect to one detection region 20, four detection pixels 2 are arranged in the column direction. Therefore, when the Von voltage is concurrently applied to the second control lines 9 connected to the four detection pixels 2 to perform signal readout, the influence of electric charge generated due to the parasitic capacity between the second control line 9 and the detection signal line 12 becomes conspicuous. In this case, electric charge caused by the parasitic capacity occurring at the detection signal line 12 is undesirably transferred to the readout unit 51 via the detection signal line 12. Here, the parasitic capacity means a capacity component determined from the material of the detection signal line 12, the physical structure thereof, the distance thereof to another line, and the dielectric constant of a material between the detection signal line 12 and another line.

The control unit 55 controls the drive unit 52 to drive the plurality of detection pixels 2 arranged in each detection region 20 at respective different timing. Then, the control unit 55 causes the signal processing unit 224 to acquire, via the readout unit 51, the amount of incidence of radiation rays for each detection region 20. The control unit 55 controls the drive unit 52 to sequentially apply the Von voltage to the second switch elements 7, thus making the second switch elements 7 conductive. Then, to read out a signal from the detection conversion element 6 of the detection pixel 2, the readout unit 51 performs readout from the plurality of detection pixels 2 included in one detection region 20 at respective different timing. More specifically, as illustrated in FIG. 5, the drive unit 52 sequentially applies the Von voltage to the signals Vd1 to Vd4 and the signals Vd5 to Vd8. In this case, the readout unit 51 causes the read-out signals to be accumulated. For example, the readout unit 51 causes the feedback capacity of the differential amplifier of the detection unit 132 to accumulate the signals. Then, when the application of the Von voltage to the signals Vd1 to Vd8 is ended, the readout unit 51 causes the detection unit 132 to perform sample and hold, thus implementing resetting of the detection signal line 12. In this way, since the plurality of detection pixels 2 arranged in each detection region 20 is driven at respective different timing, the above-mentioned influence of the parasitic capacity can be prevented. While, in the present exemplary embodiment, the outputs of the plurality of detection pixels 2 included in each detection region 20 are summed at the feedback capacity of the differential amplifier, this not limiting. For example, data subjected to digital conversion by the ADC 146 may be summed or averaged. Furthermore, in a case where analog signals are summed at the detection unit 132, noise occurring at the time of digital conversion is not added, so that noise can be reduced. In the present exemplary embodiment, during a period in which irradiation with radiation rays is being performed, the detection pixel 2 can be subjected to readout at a frequency shorter than that of the imaging pixel 1. Therefore, the amount of signal of each detection pixel 2 becomes smaller than that of each imaging pixel 1. Therefore, since summing or averaging signals of a plurality of detection pixels 2 enables amplifying signals of a predetermined detection region 20 or reducing noise, the influence of a parasitic capacity component can be reduced.

In the present exemplary embodiment, the detection regions 20 (R1 to R4) are respectively connected to the different detection signal lines 12. Furthermore, the common second control line 9 is connected between a plurality of detection regions 20. Therefore, readout of signals of the detection pixels 2 of each detection region 20 (R1 to R4) can be performed at any timing. In the present exemplary embodiment, the control unit 55 is able to concurrently perform driving or readout of detection pixels 2 arranged in different regions 20. For example, the control unit 55 controls the drive unit 52 to overlap timing for driving two or more detection pixels 2 arranged in different detection regions 20 among a plurality of detection regions 20. Under this control, the drive unit 52 is able to concurrently apply the Von voltage or Voff voltage to the signals Vd1 and Vd5. Similarly, the drive unit 52 is able to concurrently apply the Von voltage or Voff voltage to the signals Vd2 and Vd6. Then, after the Von voltage is applied by the drive unit 52 to the signals Vd1 to Vd4 and the signals Vd5 to Vd8, the readout unit 51 performs sample and hold (SH) at the detection unit 132 corresponding to each detection region 20, thus performing resetting of lines. Furthermore, the readout unit 51 is able to acquire signals corresponding to a plurality of detection regions 20 at any timing. In this way, the radiation imaging apparatus 200 according to the present exemplary embodiment can measure the amount of incidence of radiation rays in real time during the process of irradiation with radiation rays. Furthermore, in the radiation imaging apparatus 200 according to the present exemplary embodiment, the number of lines can be decreased as compared with a case where individual second control lines 9 are connected to the respective detection regions 20. Moreover, the detection unit 132 can be shared by a plurality of detection pixels included in each detection region 20, and the number of detection signal lines 12 can be decreased. When the amount of irradiation with radiation rays acquired by the readout unit 51 has reached a predetermined value, the control unit 55 can also transmit a signal to the outside via a communication interface (IF) 56.

Next, the operation in a period T3 illustrated in FIG. 5 is described. The period T3 is a time period in which, after the completion of irradiation with radiation rays, the readout unit 51 reads out signals accumulated in the imaging pixels 1 with radiation rays. In the period T3, the drive unit 52 sets the signals Vd1 to Vd8 to low level. In the period T3, to prevent the detection signal line 12 from becoming floating, it is desirable that the detection signal line 12 be connected to a fixed potential. Furthermore, to scan the first control lines 8, the drive unit 52 sequentially applies the Von voltage to the signals Vg1 to Vg12, and transfers, to the readout unit 51 via the signal lines 10, signals accumulated in the imaging conversion elements 4. As described above, the radiation imaging apparatus 200 according to the present exemplary embodiment can accurately readout irradiation with radiation rays, thus realizing more adequate dose control and exposure control.

Figure 6:
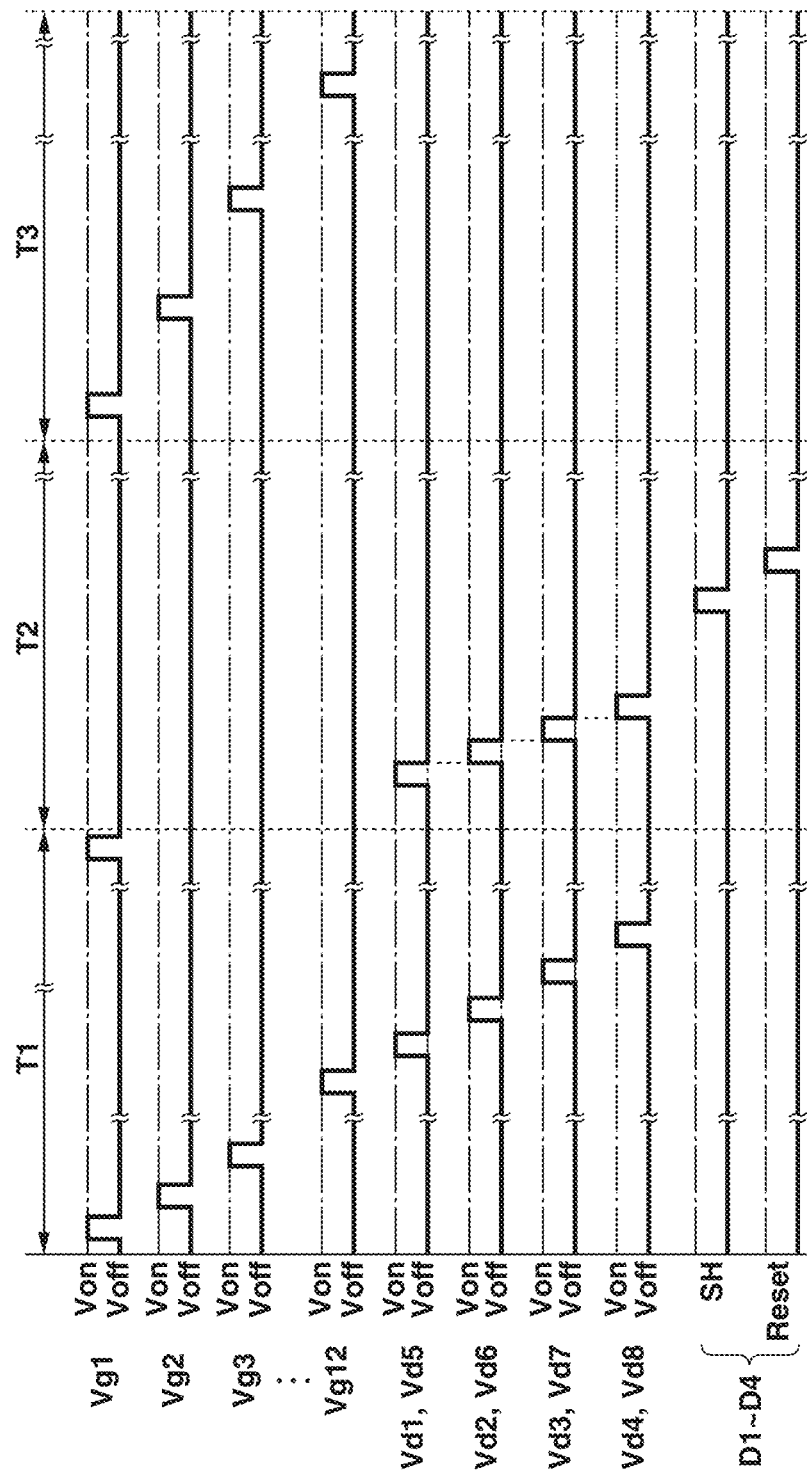
FIG. 6 illustrates an operation of a radiation imaging apparatus according to a second exemplary embodiment.

Next, a radiation imaging apparatus 200 according to a second exemplary embodiment is described with reference to FIG. 6. The configuration of the radiation imaging apparatus 200 according to the first exemplary embodiment can be applied to that of the radiation imaging apparatus 200 according to the second exemplary embodiment. The second exemplary embodiment differs from the first exemplary embodiment in that the control unit 55 controls the drive unit 52 such that the timing at which to sequentially apply the Von voltage to detection pixels 2 coincides with the timing at which to apply the Voff voltage to detection pixels 2 different from the detection pixels 2 to which the Von voltage is applied. A specific operation in the second exemplary embodiment is described now. The operations in the period T1 and the period T3 illustrated in FIG. 6 are similar to those in the first exemplary embodiment. The period T2 illustrated in FIG. 6 is a time period in which exposure is being performed with radiation rays. The control unit 55 controls the drive unit 52 to sequentially apply the Von voltage to the signals Vd1 to Vd8. In this case, to prevent the potential variation of the signal line 10 due to the parasitic capacity, the drive unit 52 applies the Von voltage to the signal Vd2 approximately at the same timing as the timing at which to apply the Voff voltage to the signal Vd1. Similarly, the drive unit 52 applies the Von voltage to the signal Vd3 approximately at the same timing as the timing at which to apply the Voff voltage to the signal Vd2, and applies the Von voltage to the signal Vd4 approximately at the same timing as the timing at which to apply the Voff voltage to the signal Vd3. The drive unit 52 repeats the above operation for the respective control lines, so that, at the time of application of the Von and Voff voltages to the second switch element 7, the potential variation of the signal line due to the parasitic capacity can be prevented.

As described above, the control unit 55 changes a voltage to be applied to at least one detection pixel 2 among a plurality of detection pixels 2 arranged in each detection region 20 from a conductive state to a nonconductive state. In this case, the control unit 55 controls the drive unit 52 to change a voltage to be applied to a detection pixel 2 different from the first-mentioned detection pixel 2 from a nonconductive state to a conductive state. According to the method of operation in the second exemplary embodiment, the driving speed can be made higher than in the first exemplary embodiment, and the decrease of accuracy due to the parasitic capacity of the detection signal line can be prevented.

Figure 7:
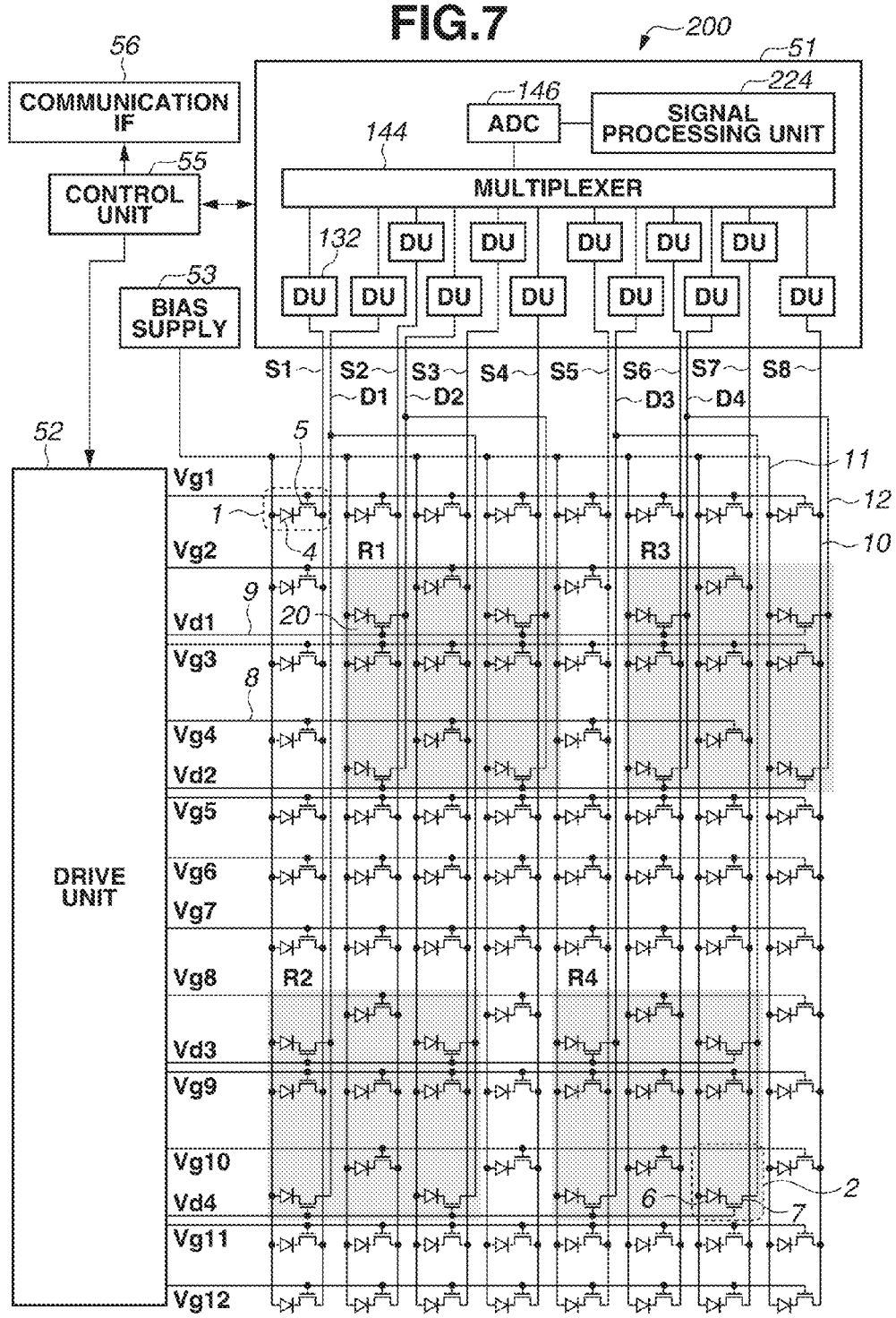
FIG. 7 illustrates a configuration of a radiation imaging apparatus according to a third exemplary embodiment.
Figure 8:
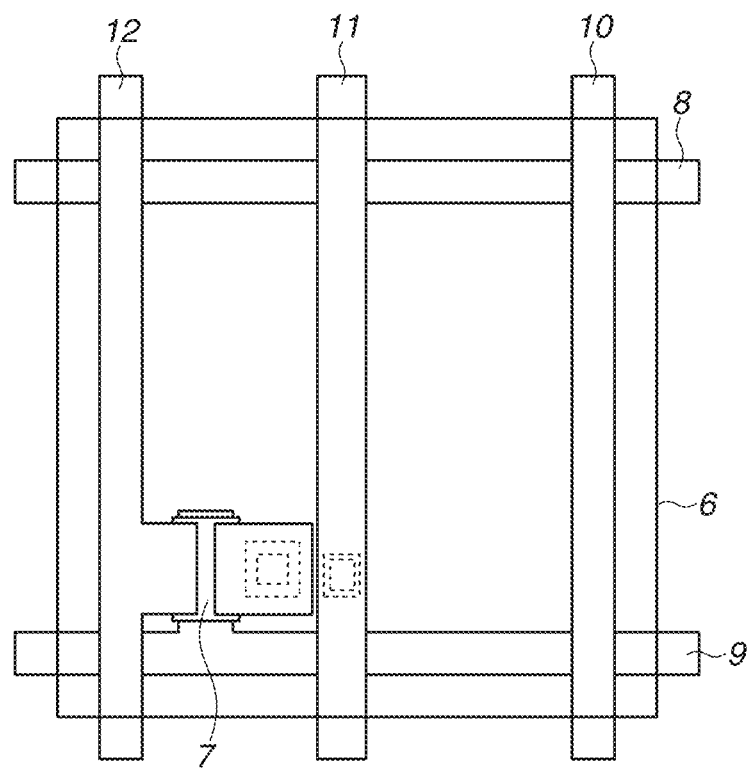
FIG. 8 illustrates a detection pixel in the radiation imaging apparatus according to the third exemplary embodiment.

Next, a radiation imaging apparatus 200 according to a third exemplary embodiment is described with reference to FIG. 7 and FIG. 8. In the third exemplary embodiment, portions similar to those of the first exemplary embodiment are omitted from description. FIG. 7 illustrates a configuration of the radiation imaging apparatus 200 according to the third exemplary embodiment. FIG. 8 illustrates a structure of the detection pixel 2 according to the third exemplary embodiment. The third exemplary embodiment differs from the first exemplary embodiment in that, as illustrated in FIG. 8, the detection pixel 2 is composed of a combination of the detection conversion element 6 and the second switch element 7, which thus does not include the imaging conversion element 4 and the first switch element 5. According to this configuration, the area of the detection conversion element 6 can be set larger, so that the sensitivity of detection of radiation rays can be improved. In this case, the detection pixel 2, which includes no imaging conversion element 4, may be treated as a defective pixel. However, data of the defective pixel can be complemented based on outputs of adjacent imaging pixels or image data. Furthermore, in the radiation imaging apparatus 200 according to the third exemplary embodiment, each of detection regions 20 (R1 to R4) includes four detection pixels 2 arranged in a 2×2 matrix form. The number of detection pixels 2 included in each detection region 20 is not limited to four. Even in this configuration, similar to the first exemplary embodiment, since the second control lines 9 are divided into a plurality of channels in each detection region 20, the potential variation due to the parasitic capacity can be prevented.

Next, a radiation imaging apparatus 200 according to a fourth exemplary embodiment is described with reference to FIG. 9 and FIG. 10. In the fourth exemplary embodiment, portions similar to those of the aforementioned exemplary embodiments are omitted from description.

Figure 9:
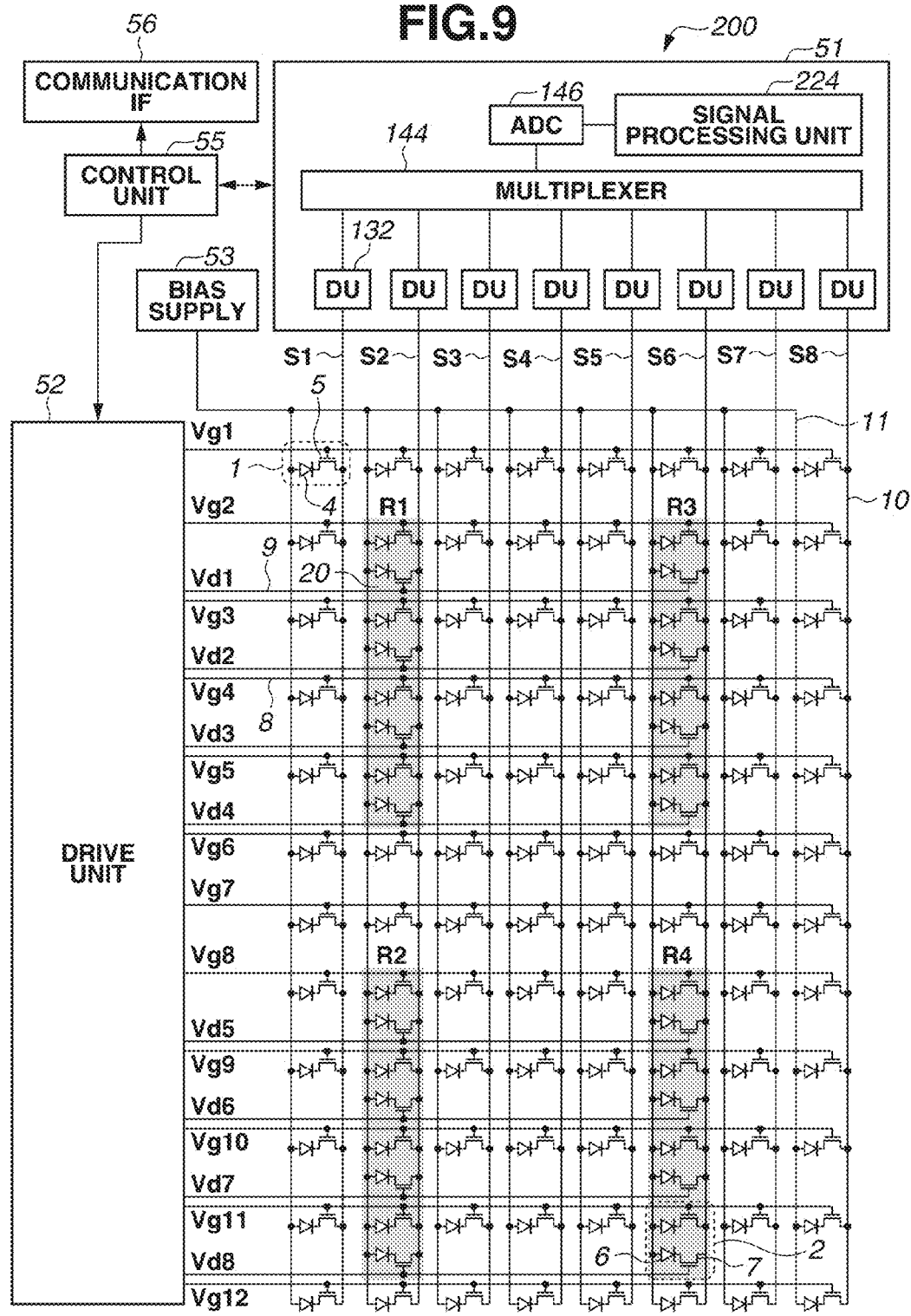
FIG. 9 illustrates a configuration of a radiation imaging apparatus according to a fourth exemplary embodiment.

FIG. 9 illustrates a configuration of the radiation imaging apparatus 200 according to the fourth exemplary embodiment.

The fourth exemplary embodiment differs from the first to third exemplary embodiments in that readout of signals from the imaging pixel 1 and the detection pixel 2 is performed via a common signal line (the signal line 10). Furthermore, a plurality of detection regions 20 is interconnected via a common signal line. More specifically, among a plurality of detection regions 20, for example, the detection pixels 2 of the detection regions R1 and R2 are interconnected via a common signal line 10 (S2). Similarly, among a plurality of detection regions 20, the detection pixels 2 of the detection regions R3 and R4 are interconnected via a common signal line 10 (S6). According to this configuration, since the detection units 132 can be shared, the number of detection units 132 can be decreased as compared with the aforementioned exemplary embodiments.

Figure 10:
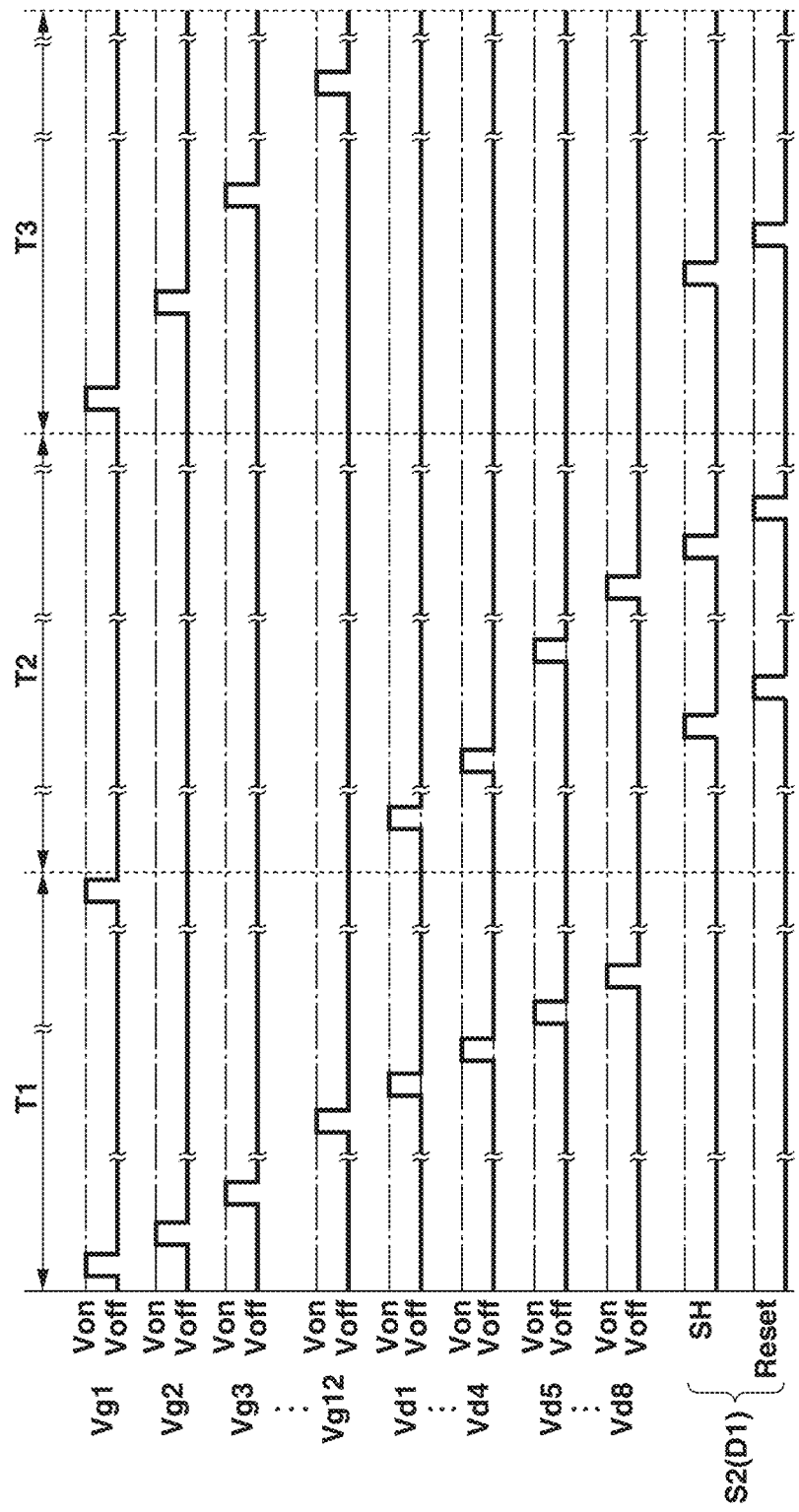
FIG. 10 illustrates an operation of the radiation imaging apparatus according to the fourth exemplary embodiment.

FIG. 10 illustrates an operation of the radiation imaging apparatus 200 according to the fourth exemplary embodiment. The operations in the period T1 and the period T3 illustrated in FIG. 10 are similar to those in the aforementioned exemplary embodiments.

The period T2 illustrated in FIG. 10 is a time period in which irradiation is being performed with radiation rays. The definition of periods is the same as that in the aforementioned exemplary embodiments. The control unit 55 performs control to acquire signals from the detection pixels 2 for each set of detection regions 20 connected to the common detection unit 132. First, the control unit 55 controls the drive unit 52 to sequentially apply the Von voltage to the signals Vd1 to Vd4. Then, the drive unit 52 makes the signal Vd4 nonconductive, performs sample and hold (SH), and performs resetting of lines. Next, to acquire signals from the other detection regions 20, the control unit 55 controls the drive unit 52 to sequentially apply the Von voltage to the signals Vd5 to Vd8. Then, the drive unit 52 makes the signal Vd8 nonconductive, performs sample and hold (SH), and performs resetting of lines. Furthermore, after the amount of irradiation with radiation rays measured by the readout unit 51 has reached a setting value, the control unit 55 may transmit a signal to the radiation source 1005 to stop irradiation with radiation rays.

According to the fourth exemplary embodiment, the radiation imaging apparatus 200 can accurately read out irradiation with radiation rays with a simple configuration of the readout unit 51, thus realizing more adequate dose control and exposure control.

Figure 12A:
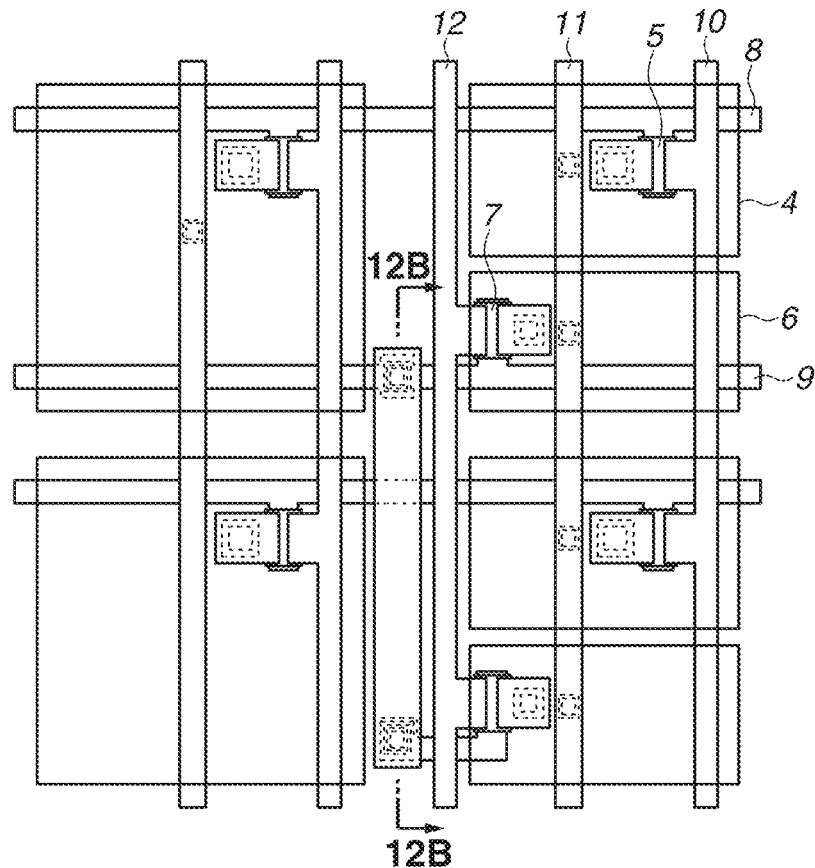
FIGS. 12A and 12B illustrate pixels in the radiation imaging apparatus according to the fifth exemplary embodiment.
Figure 12B:
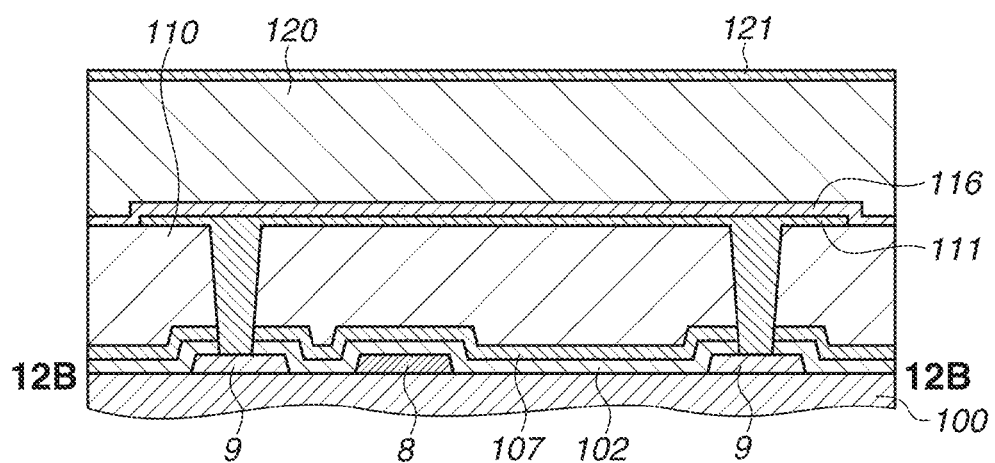

Next, a radiation imaging apparatus 200 according to a fifth exemplary embodiment is described with reference to FIG. 11 and FIGS. 12A and 12B. In the fifth exemplary embodiment, portions similar to those of the aforementioned exemplary embodiments are omitted from description. The fifth exemplary embodiment differs from the aforementioned exemplary embodiments in that the second control line 9 branches, in the vicinity of each detection region 20, into two lines, which are then connected to a plurality of detection pixels 2 in the detection region 20.

FIG. 11 illustrates a configuration of the radiation imaging apparatus 200 according to the fifth exemplary embodiment.

For example, as illustrated in FIG. 11, the second control line 9 branches into two lines in the vicinity of the detection pixels 2. The number of branches is not limited to two, but may be more than two as long as the second control line 9 branches, at least, in such a way as to reduce the parasitic capacity, which is described below. According to this configuration, the number of points at which the second control line 9 intersects with the signal line 10 or the detection signal line 12 can be decreased. Then, an artifact of signals read out via the signal line 10 due to the parasitic capacity at a point of intersection between the second control line 9 and the signal line 10 can be reduced. In addition, the potential variation of the detection signal line 12 due to the parasitic capacity between the second control line 9 and the detection signal line 12 can be reduced.

Next, a configuration of pixels in the radiation imaging apparatus 200 according to the fifth exemplary embodiment is described. FIG. 12A is a plan view of pixels encircled by a dashed line "a" illustrated in FIG. 11. FIG. 12B is a sectional view of the pixels taken along line 12B-12B illustrated in FIG. 12A. The second control line 9 illustrated in FIG. 12A is wired to the lower right pixel via a contact hole provided between the upper left pixel and the upper right pixel, and is thus connected to the second switch element 7. As illustrated in FIG. 12B, the individual electrode 111 and the second control line 9 are connected to each other via the contact hole.

According to the configuration of the fifth exemplary embodiment in which the parasitic capacity can be more reduced, the radiation imaging apparatus 200 can accurately read out irradiation with radiation rays, thus realizing more adequate dose control and exposure control.

Figure 13:
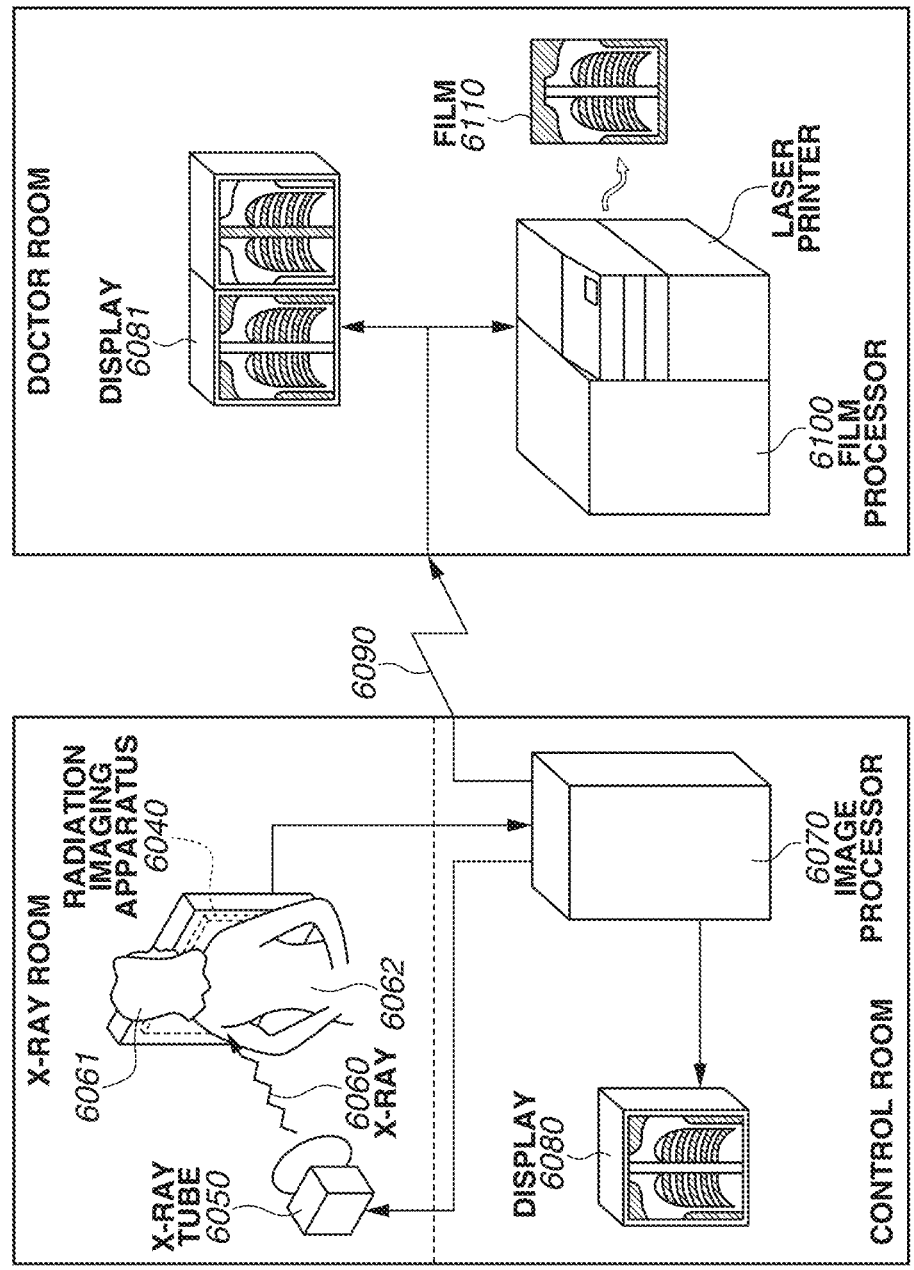
FIG. 13 illustrates an example of a radiation imaging system to which a radiation imaging apparatus according to an exemplary embodiment is applied.

Next, a radiation imaging system using a radiation imaging apparatus according to a further exemplary embodiment is described with reference to FIG. 13. In an X-ray room, X-rays 6060 generated by an X-ray tube 6050, which is a radiation source, pass through the chest 6062 of a patient or subject 6061 and then enter a radiation imaging apparatus 6040, which corresponds to the radiation imaging apparatus 200 described in the aforementioned exemplary embodiments. The X-rays entering the radiation imaging apparatus 6040 contain information about the inside of the body of the patient 6061. The radiation imaging apparatus 6040 converts the entering X-rays (radiation rays) into electric charge with the imaging pixels 1 to acquire electrical information. The acquired electrical information is converted into digital image data. The digital image data is processed by an image processor 6070, which is a signal processing unit. The processed image data can be viewed via a display 6080, which is a display unit in a control room.

Furthermore, such image information can be transmitted to a remote location via a transmission processing unit, such as a telephone line 6090, and thus can be displayed on a display 6081, which is a display unit, in a remote doctor room or can be stored in a recording unit, such as an optical disc, so that a doctor residing in a remote location can also diagnose the patient 6061. Moreover, such image information can be recorded on a film 6110, which is a recording medium, by a film processor 6100, which is a recording unit.

Additionally, an exemplary embodiment of the present invention can also be implemented by a computer or control computer executing a program (computer program). Moreover, a unit for supplying a program to a computer, for example, a computer-readable storage medium, such as a compact disc read-only memory (CD-ROM), storing the program or a transmission medium, such as the Internet, for transmitting the program, can also be applied as an exemplary embodiment of the present invention. In addition, the above-mentioned program can also be applied as an exemplary embodiment of the present invention. The above-mentioned program, storage medium, transmission medium, and program product are encompassed in the scope of the present invention.

While the present invention has been described in detail with reference to exemplary embodiments, it is to be understood that the invention is not limited to the disclosed specific exemplary embodiments, and various embodiments not departing from the gist of the present invention can also be encompassed in the scope of the present invention. Moreover, the above-described exemplary embodiments are mere examples, and all or some of the above-described exemplary embodiments can be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249429 filed Dec. 9, 2014, which is hereby incorporated by reference herein in its entirety.

What is claimed is:

1. An apparatus comprising:
a plurality of imaging pixels configured to acquire a radiation image;
a plurality of detection pixels each including a detection conversion element, which detects an incident radiation ray, and a detection switch element, which is connected to the detection conversion element;
a drive unit configured to drive the detection switch element of each of the plurality of detection pixels;
a plurality of detection regions in each of which the plurality of detection pixels are arranged;
a control unit configured to control the drive unit to drive the plurality of detection pixels arranged in each of the plurality of detection regions at respective different timing; and
an acquisition unit configured to acquire an amount of incidence of radiation rays on each of the plurality of detection regions based on a value obtained by summing or averaging signals read out from the plurality of detection pixels.

2. The apparatus according to claim 1, wherein the acquisition unit acquires the amount of incidence of radiation rays based on a value obtained by summing or averaging digital signals converted from analog signals acquired from the plurality of detection pixels.

3. The apparatus according to claim 2, further comprising a plurality of detection units configured to detect analog signals respectively corresponding to the plurality of detection regions,
wherein each of the plurality of detection units performs processing for summing or averaging analog signals acquired from the plurality of detection pixels, and
wherein the acquisition unit acquires the amount of incidence of radiation rays based on the summed or averaged analog signals.

4. The apparatus according to claim 3, further comprising a detection signal line that connects each of the plurality of detection units to the corresponding detection conversion element,
wherein the detection signal line is connected in common to the plurality of detection pixels arranged in each of the plurality of detection regions.

5. The apparatus according to claim 1, further comprising a control line that connects the drive unit to each of the plurality of detection regions,
wherein the control line is connected in common to different detection regions among the plurality of detection regions.

6. The apparatus according to claim 5, wherein the control line is branched and connected between the drive unit and each of the plurality of detection regions.

7. The apparatus according to claim 5, wherein the control line includes a plurality of control lines, and
wherein the plurality of control lines are individually connected to the respective plurality of detection pixels in each of the plurality of detection regions.

8. The apparatus according to claim 1, wherein the control unit controls the drive unit to overlap timing for driving two or more detection pixels arranged in different detection regions among the plurality of detection regions.

9. The apparatus according to claim 1, wherein the control unit controls the drive unit to, when changing a voltage to be applied to at least one detection pixel among the plurality of detection pixels arranged in each of the plurality of detection regions from a conductive state to a nonconductive state, change a voltage to be applied to a detection pixel different from the at least one detection pixel from a nonconductive state to a conductive state.

10. The apparatus according to claim 1, further comprising a readout unit configured to read out signals respectively output from the plurality of imaging pixels and the plurality of detection pixels via respective different signal lines.

11. The apparatus according to claim 1, wherein the plurality of detection pixels in each of the plurality of detection regions is regularly arranged in at least one direction among a row direction, a column direction, and a diagonal direction.

12. A system comprising:
a radiation source configured to generate a radiation ray; and
the apparatus according to claim 1.

13. The system according to claim 12, wherein the apparatus further comprises a control line that connects the drive unit to each of the plurality of detection regions, and
wherein the control line is connected in common to different detection regions among the plurality of detection regions.

14. The system according to claim 12, wherein the control unit of the apparatus controls the drive unit to overlap timing for driving two or more detection pixels arranged in different detection regions among the plurality of detection regions.

15. The system according to claim 12, wherein the control unit of the apparatus controls the drive unit to, when changing a voltage to be applied to at least one detection pixel among the plurality of detection pixels arranged in each of the plurality of detection regions from a conductive state to a nonconductive state, change a voltage to be applied to a detection pixel different from the at least one detection pixel from a nonconductive state to a conductive state.

16. A control method for an apparatus including a plurality of imaging pixels configured to acquire a radiation image, a plurality of detection pixels each including a detection conversion element, which detects an incident radiation ray, and a detection switch element, which is connected to the detection conversion element, a drive unit configured to drive the detection switch element of each of the plurality of detection pixels, and a plurality of detection regions in each of which the plurality of detection pixels are arranged, the control method comprising:
    controlling the drive unit to drive the plurality of detection pixels arranged in each of the plurality of detection regions at respective different timing; and
    acquiring an amount of incidence of radiation rays on each of the plurality of detection regions.

* * * * *